United States Patent [19]
Goins et al.

[11] Patent Number: 5,685,453
[45] Date of Patent: *Nov. 11, 1997

[54] FOOD PACKAGING COVER

[75] Inventors: Timothy S. Goins, Evanston; Stephen A. Smith, Naperville; Matthew O. Banach, Lake Zurich; Daniel R. Proper, Downers Grove, all of Ill.

[73] Assignee: Tenneco Packaging Inc., Evanston, Ill.

[ * ] Notice: The term of this patent shall not extend beyond the expiration date of Pat. No. Des. 374,376.

[21] Appl. No.: 559,348

[22] Filed: Nov. 15, 1995

[51] Int. Cl.$^6$ .............................. B29C 45/00; B65D 6/38; B65D 8/12
[52] U.S. Cl. .................... 220/782; 220/671; 220/675; 220/787; 264/328.1
[58] Field of Search ............................ 220/307, 306, 220/669, 671, 675, 670, 780, 781, 782, 783, 784, 787, 790, 789; 206/551; D7/540, 561, 562, 610; D9/428, 429; 312/284, 285

[56] References Cited

U.S. PATENT DOCUMENTS

| | | | |
|---|---|---|---|
| D. 50,459 | 3/1917 | Andrews | D7/562 |
| D. 93,461 | 10/1934 | Vaulchier | D9/429 |
| D. 218,804 | 9/1970 | Bryant | D9/429 |
| D. 345,894 | 4/1994 | Krupa . | |
| D. 346,554 | 5/1994 | Krupa . | |
| D. 352,000 | 11/1994 | Hansen et al. . | |
| D. 358,091 | 5/1995 | Warburton | D9/429 |
| D. 374,376 | 10/1996 | Goins et al. | D9/429 X |
| 4,146,170 | 3/1979 | Medendorp | 220/307 X |
| 4,741,452 | 5/1988 | Holzkopf . | |
| 4,863,058 | 9/1989 | Antoni et al. . | |
| 4,874,083 | 10/1989 | Antoni et al. . | |
| 5,287,959 | 2/1994 | Hansen et al. . | |
| 5,441,166 | 8/1995 | Lucas, Jr. et al. | D9/429 X |

OTHER PUBLICATIONS

Ultra Pac Catalog, "Ultra Fresh™ Bakery Containers", Ultra Pac, Inc., Rogers, Minnesota, Mar. 1995, pp. 1–9.
Mobil Brochure, "Mobil DuraView™ Bakery Containers", Mobil Chemical Plastics Division, 1993, 4 pages.
Mobil Brochure, "ClearView™ Containers", Mobil Chemical Plastics Division, date unknown, 8 pages.
PCA Product Sheet, "Showcake® Packaging", PCA Specialty Packaging Group, Northbrook, Illinois, 1994, one page.
PCA Product Sheet "Sweet Treats for Special Times", PCA Specialty Packaging Group, Northbrook, Illinois, Dec. 1994, one sheet.
PCA Brochure, "Showcake® Packaging", PCA Specialty Packaging Group, Northbrook, Illinois Feb. 1995, four pages.
Ultra Pac Product Sheet, "Ultra Fresh™ Bakery Containers", Ultra Pac, Inc., Rogers, Minnesota, date unknown, one sheet.
Plastics Incorporated Catalog, "Plastics Incorporated", Plastics Inc., St. Paul, Minnesota, 1994, pp. 1–24.

*Primary Examiner*—Allan N. Shoap
*Assistant Examiner*—Niki Kopsidas
*Attorney, Agent, or Firm*—Arnold, White & Durkee

[57] ABSTRACT

A food packaging container is presented having a cover and a base. The cover has a top and a first side wall. The top contains a central portion and a peripheral shoulder, where the shoulder encompasses the central portion. The first side wall extends downward from the shoulder and encompasses the top wall. The first side wall also has at least two generally vertical and outwardly directed ribs repeating in a predetermined rib pattern, where the one rib is generally pointed at an outermost portion thereof, and the second rib is generally flat at an outermost portion thereof. The two ribs form generally vertical furrows that interconnect adjacent fibs. The base has a bottom and a second side wall which encompasses and extends upward from the bottom. The base is adapted to engage the cover.

25 Claims, 10 Drawing Sheets

FOOD PACKAGING COVER

FIELD OF THE INVENTION

The present invention relates generally to high-strength food packaging covers. More particularly, the invention relates to a food packaging cover which facilitates application of a label thereto while maintaining structural strength.

BACKGROUND OF THE INVENTION

The use of inexpensive plastic or metallic food packaging containers has become popular for dispensing and serving various food products including bakery goods, catered food, and delicatessen products. Such food packaging containers are often comprised of a plastic cover with a top and a downwardly extending side wall. Existing food packaging covers generally provide structural strength with vertical ribs located on the side walls of the covers. The plastic covers also are usually adapted to connect to a base and secure the food product therein. Grocery stores, catering services and restaurants utilize these food packaging covers and bases in their businesses because they are structurally strong, light weight, attractive, stackable, and disposable.

However, it is often difficult to consistently attach a label identifying the enclosed food products to existing food packaging covers. Specifically, the ribbed side walls of the covers that provide structural strength to resist denting or buckling do not allow a label to securely adhere to the outer surface. Moreover, many existing food packaging covers that do provide a generally flat concentrated surface for applying a label must be precisely oriented in the manufacturing process so that the label may be properly placed on the concentrated flat surface of the cover. Therefore, applying a label to the existing covers produces another step in the manufacturing process, resulting in greater costs to the manufacturer and customers.

A need, therefore, exists for a food packaging cover which overcomes these disadvantages.

SUMMARY OF THE INVENTION

Briefly, the present invention is directed to a new and improved food packaging cover. The cover comprises a top wall including a central portion and a peripheral shoulder, where the shoulder encompasses the central portion. The cover also has a side wall that encompasses the top wall and extends downward from the peripheral shoulder. The side wall contains at least first and second generally vertical and outwardly directed ribs that repeat in a predetermined rib pattern. The first ribs are generally pointed at the outermost portions thereof while the second ribs are generally flat at outermost portions thereof. The outermost portions of the first ribs and the outermost portions of the second ribs are approximately the same radial distance from the central axis of the cover when the cover is generally cylindrical in shape, where the radial distance is measured along a cross-section taken parallel to and below the top wall of the cover. In addition, the ribs form generally vertical furrows that interconnect adjacent ribs.

The above summary of the present invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 15:
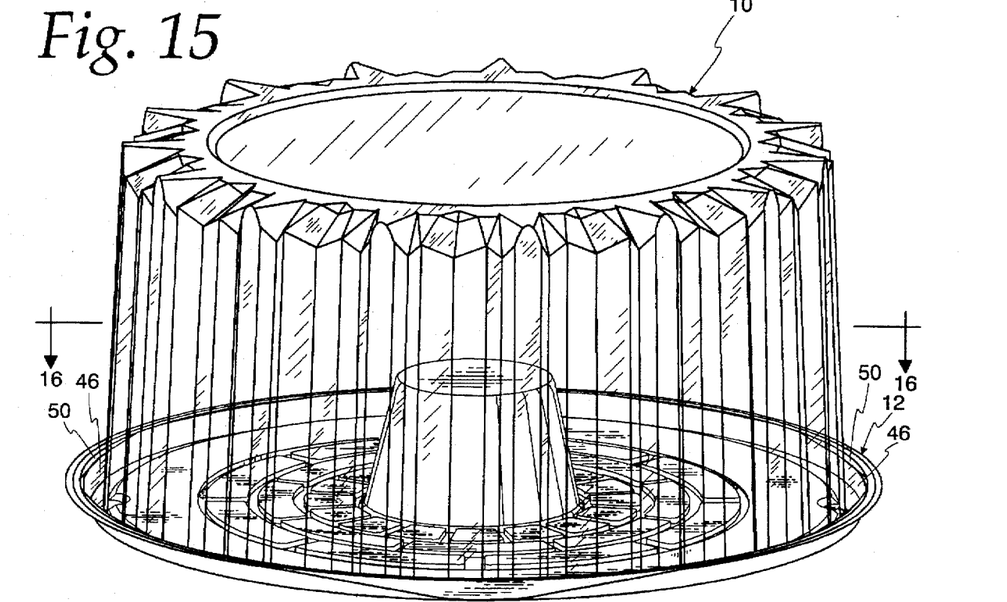
FIG. 15 is a perspective view of an assembled food packaging container including the cover and the base.

Referring now to the drawings, FIGS. 1–7 depict an improved food packaging cover 10, and FIGS. 8–14 depict a base 12 adapted to releasably engage the cover 10. FIG. 15 illustrates an assembled food packaging container including the cover 10 engaged to the cooperating base 12. While the cover 10 as illustrated is of generally cylindrical configuration, the invention herein disclosed is not intended to be limited thereto but may take various other geometric shapes, such as square, rectangular, oval, triangular, etc.

Referring to FIGS. 1–7, the cover 10 includes a top wall 14 and a first side wall 16. The side wall 16 encompasses the top wall 14 and extends downward and slightly outward from the top wall 14. The top wall 14 consists of a central portion 22 and a peripheral shoulder 24, which encompasses the central portion 22 and interconnects the top wall 14 and the side wall 16. The top wall 14 is elevated with respect to the cooperating base 12 to provide room for the accommodated product, and the top wall 14 is generally planar. In order to enhance the aesthetic appearance and marketing appeal of the cover 10, the top wall 14 may be intaglioed with an attractive design. In addition, the side wall 16 forms a section of an imaginary cone having an imaginary point located along a central vertical axis of the cover 10 above the top wall 14. The central portion 22 is recessed relative to the peripheral shoulder 24, enabling the top wall 14 to engageably connect with the base 12 of another food packaging container for stacking of the containers. While the central portion 22 is illustrated as being circular in shape, it may also be polygonal in shape.

Figure 1:
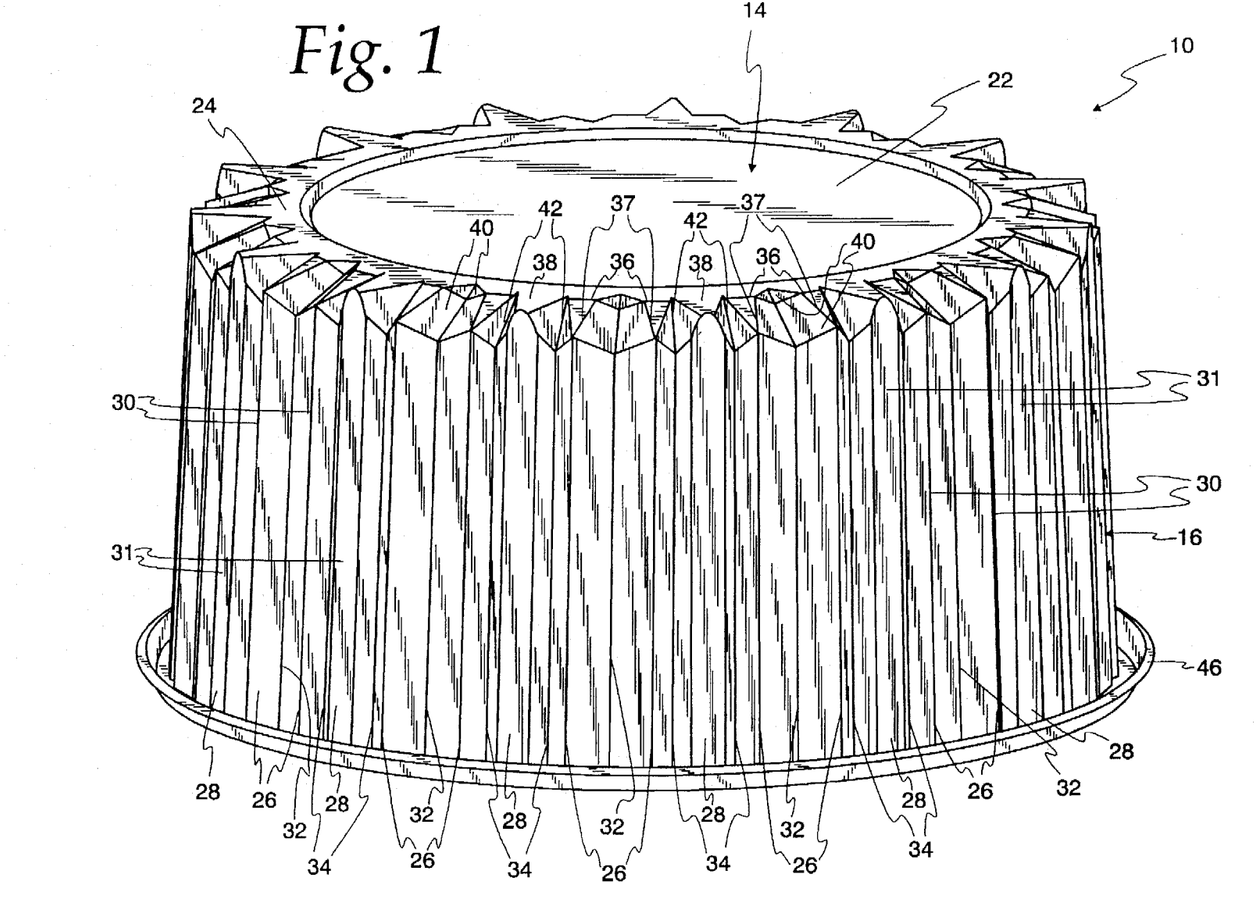
FIG. 1 is a perspective view of a food packaging cover embodying the present invention.
Figure 1A:
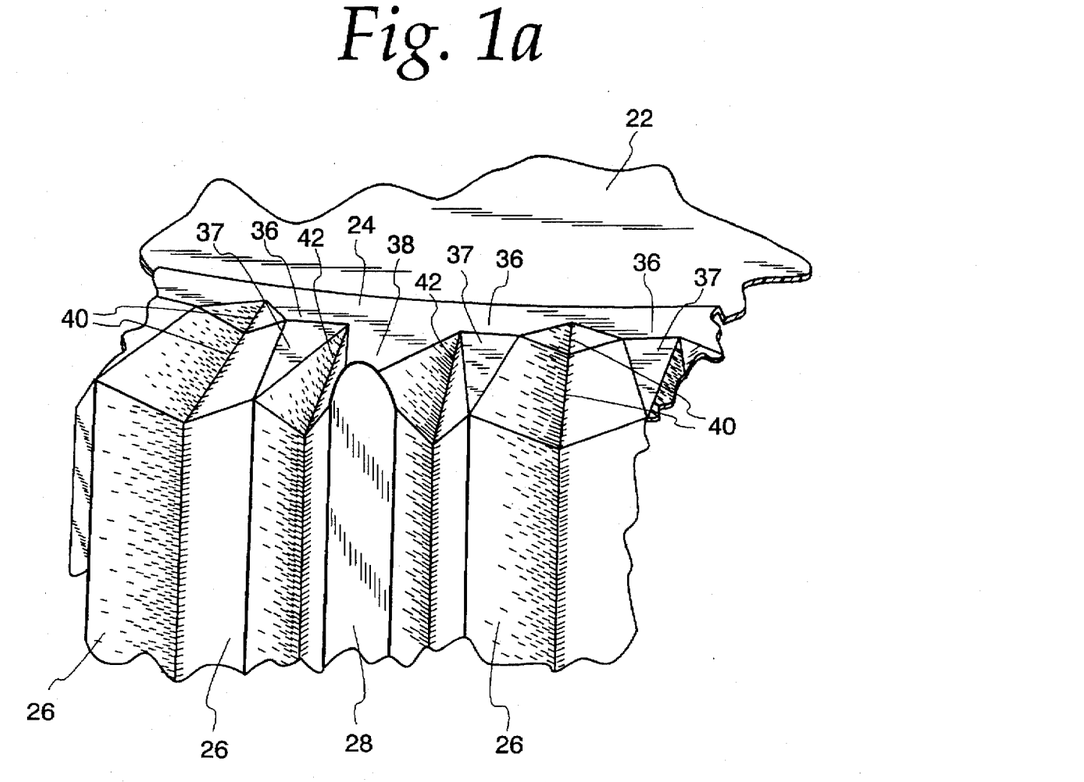
FIG. 1a is an enlarged view of the rib structure in FIG. 1.
Figure 2:
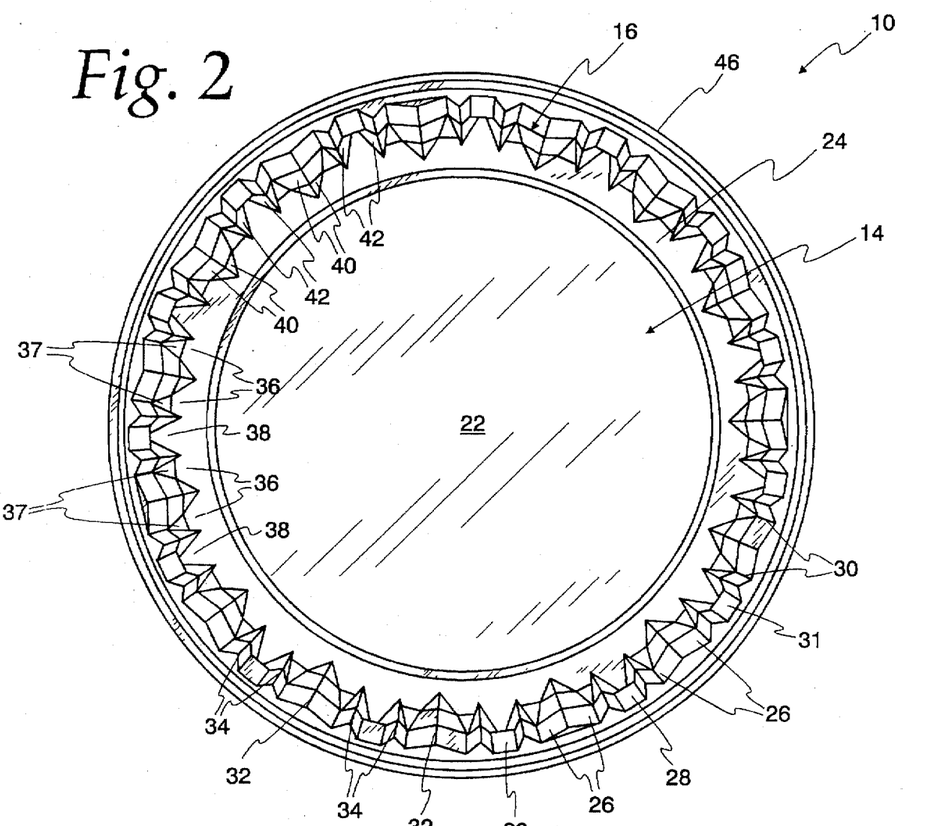
FIG. 2 is a top view of the cover.
Figure 2A:
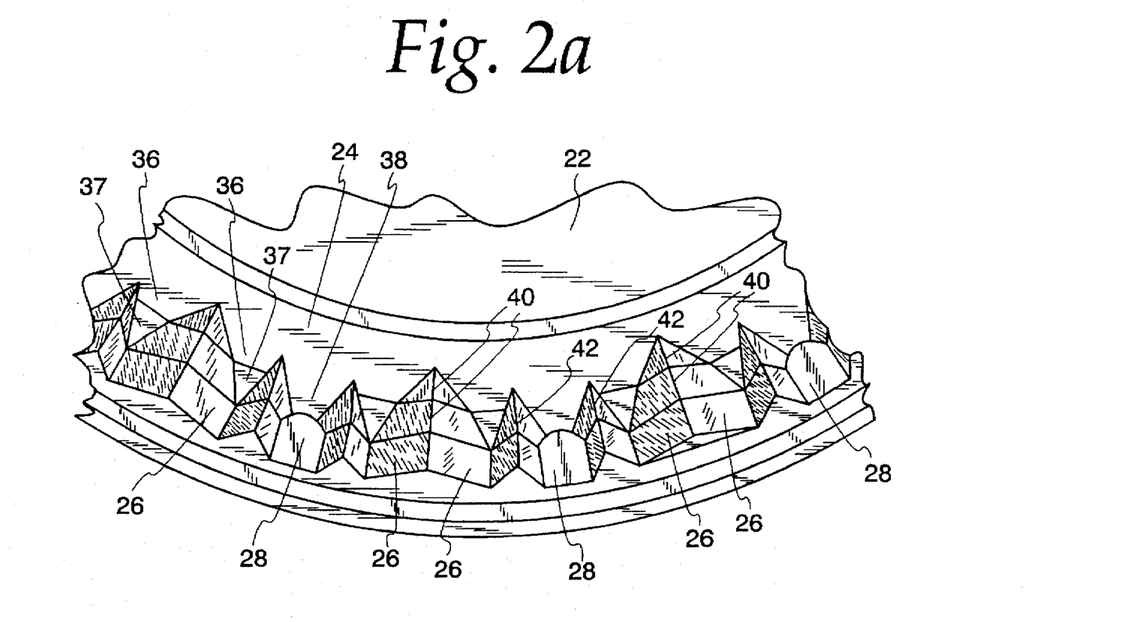
FIG. 2a is an enlarged view of the rib structure in FIG. 2.
Figure 3:
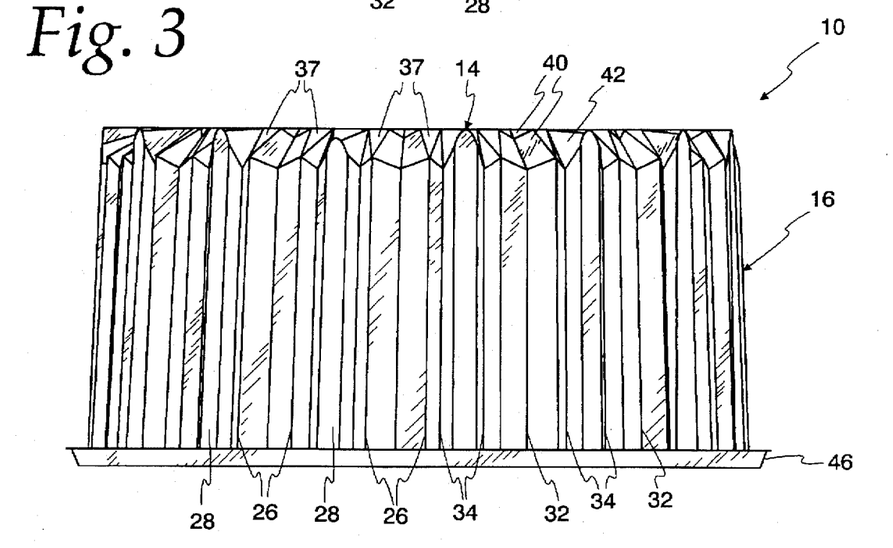
FIG. 3 is a front view of the cover.
Figure 4:
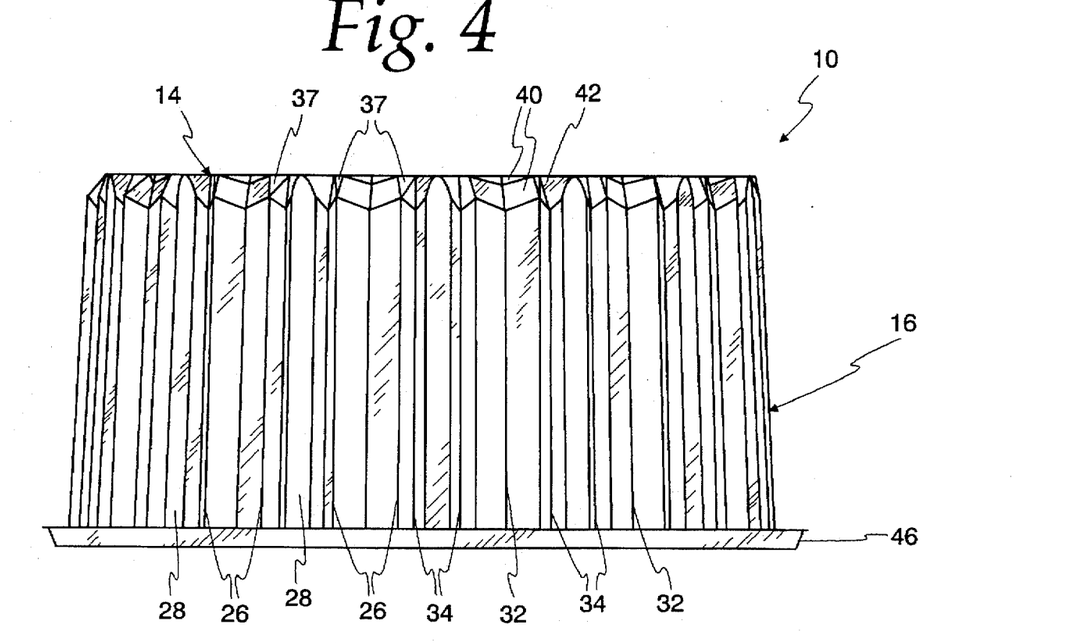
FIG. 4 is a first side view of the cover.
Figure 5:
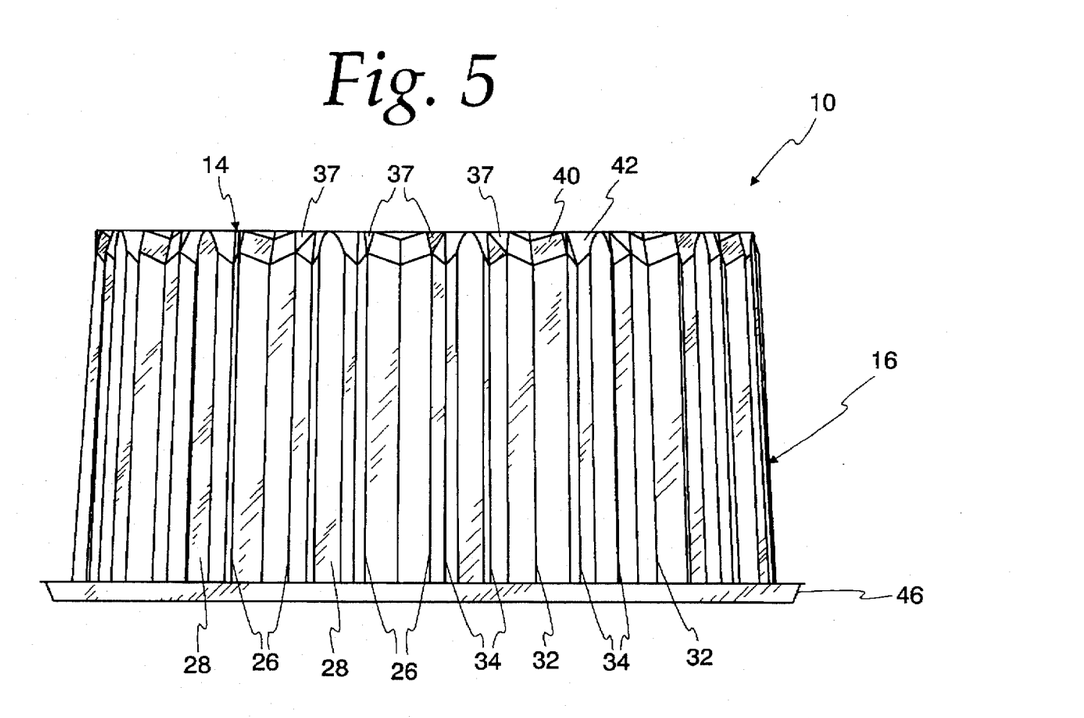
FIG. 5 is a back view of the cover.
Figure 6:
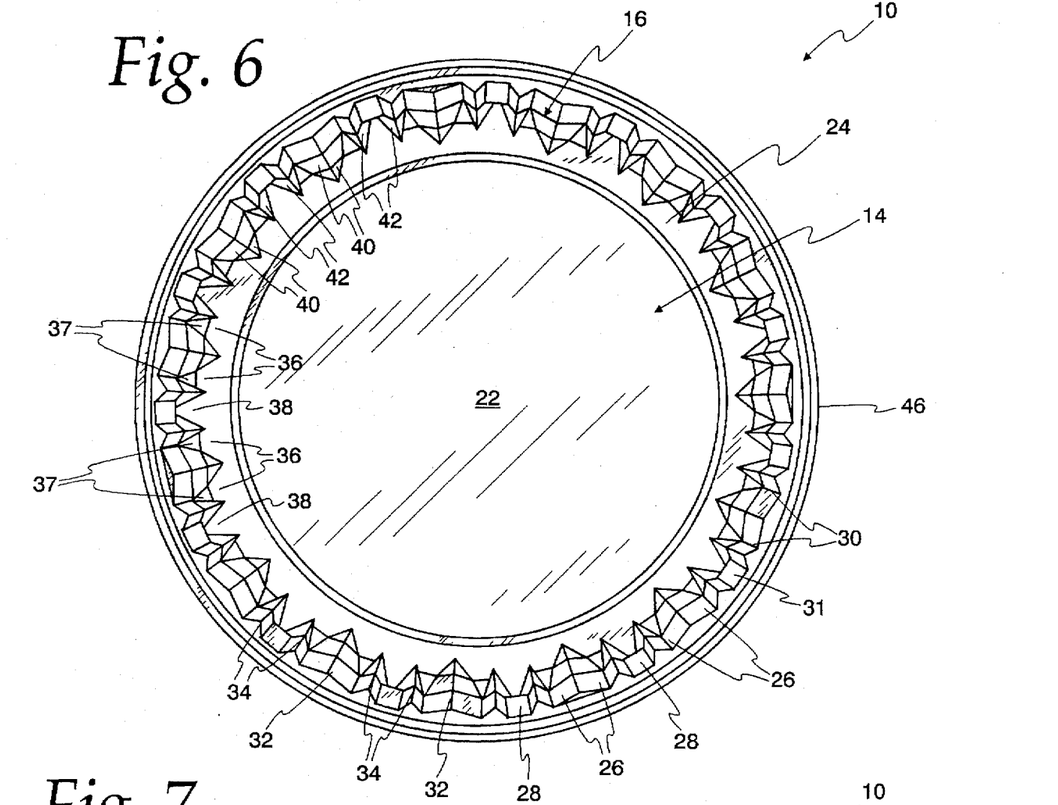
FIG. 6 is a bottom view of the cover.
Figure 7:
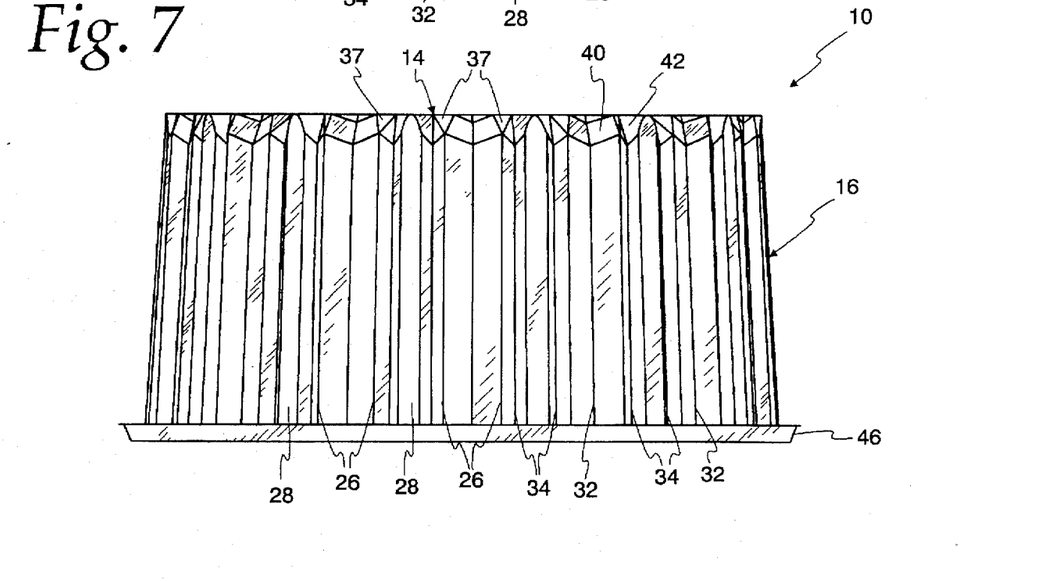
FIG. 7 is second side view of the cover.
Figure 8:
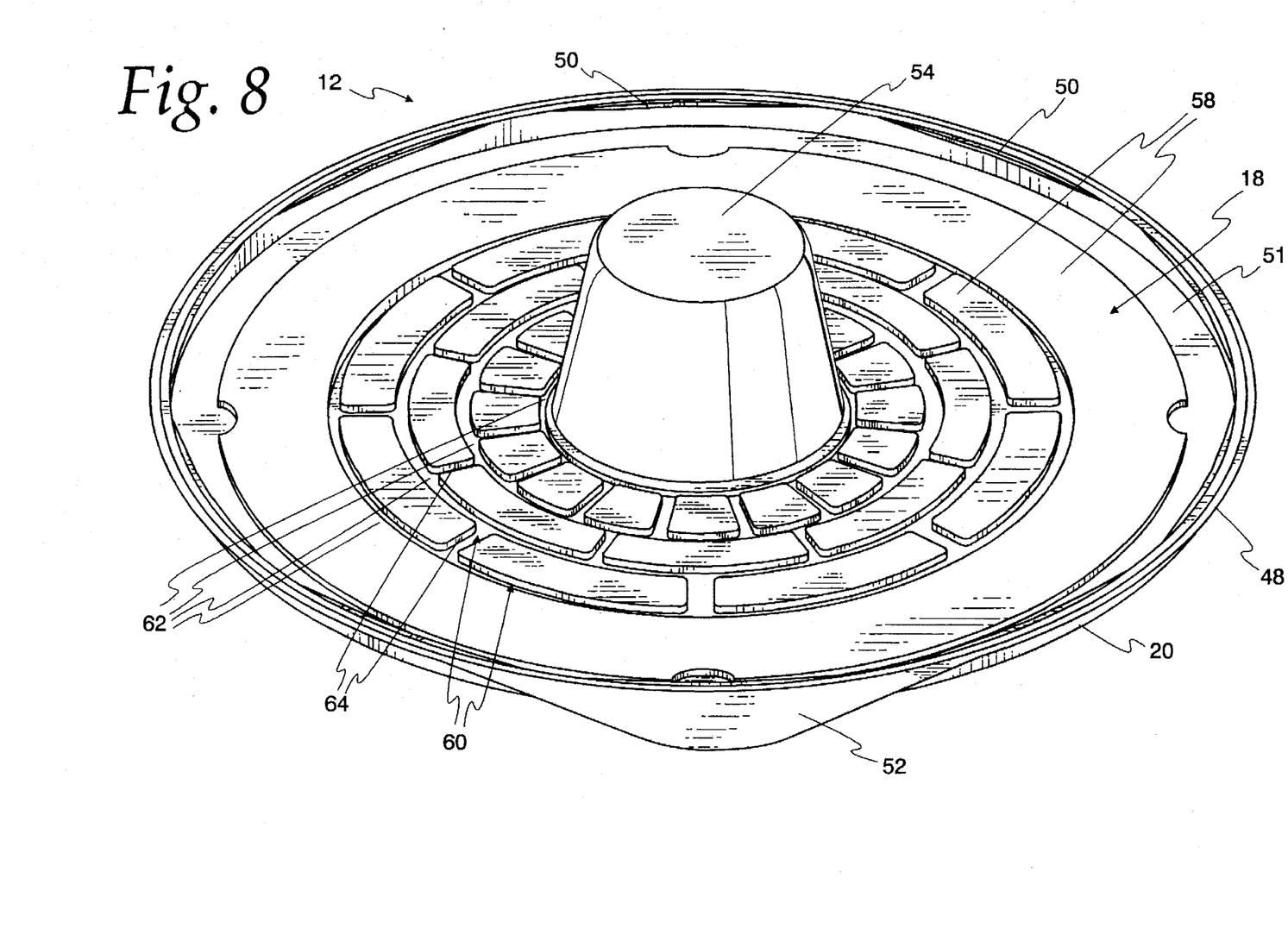
FIG. 8 is a perspective view of a base adapted to engage the cover.
Figure 9:
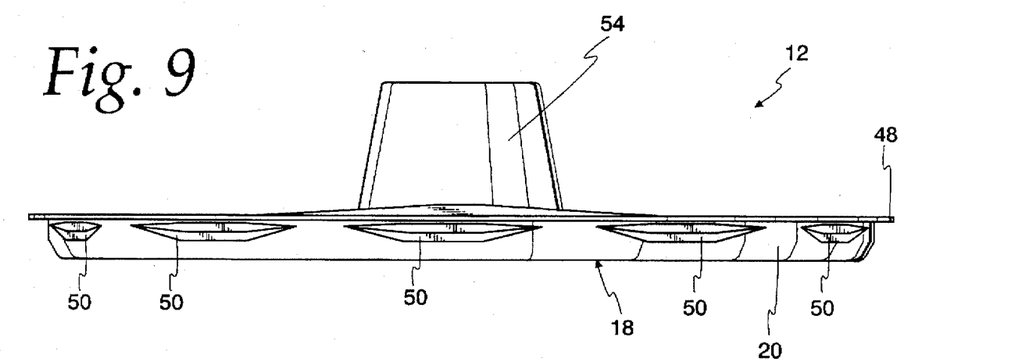
FIG. 9 is a front view of the base.
Figure 16:
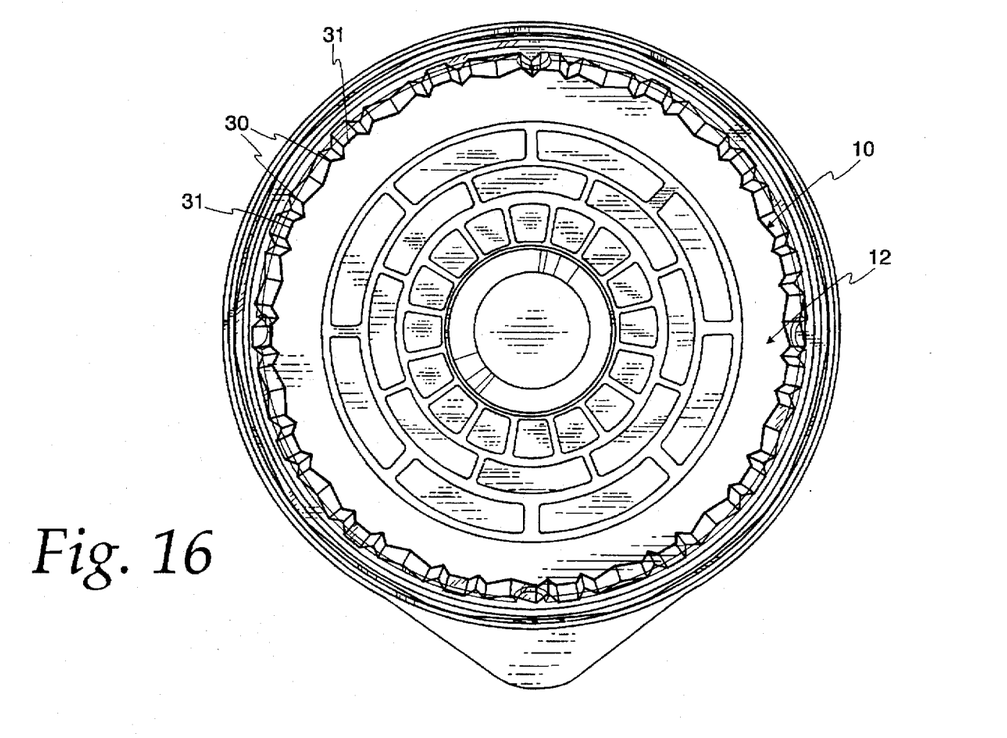
FIG. 16 is a cross-sectional view of the assembled food packaging container in FIG. 15 taken generally parallel to and below the top wall of the cover and looking downward toward the base.

The side wall 16, encompassing and extending downward from the peripheral shoulder 24, is comprised of at least first and second generally vertical and outwardly directed ribs 26 and 28 that repeat in a predetermined rib pattern. The first ribs 26 are generally pointed at the outermost portions 30 thereof, while the second ribs 28 are generally flat at the outermost portions 31 thereof. The generally flat outermost portions 31 of the second ribs 28 is actually a section of a helix that creates a smooth portion on a generally conical surface. As best shown in FIG. 16, the outermost portions 30 of the first ribs 26 and the outermost portions 31 of the second ribs 28 are approximately the same radial distance from the central vertical axis of the cover 10, where the radial distance is measured along a cross-section taken parallel to and below the top wail of the cover 10. The central vertical axis of the cover 10 is perpendicular to the recessed central portion 22 of the top wall 14 and passes through a center point of the recessed central portion 22. In a preferred embodiment, the predetermined rib pattern includes a pair of the first ribs 26 and one of the second ribs 28. The first ribs 26 and the second ribs 28 form generally vertical, alternately repeating furrows 32 and 34 that interconnect the ribs adjacent to each one. The furrows 32 and 34 extend substantially the entire vertical height of the side wail 16, and are preferably triangular in cross section (FIG. 2). The width of each furrow 32 either remains the same or slightly decreases from top to bottom and the width of each furrow 34 increases from top to bottom. Further information regarding the construction of furrows 32 and 34 can be obtained from U.S. Pat. No. 4,863,058, incorporated herein by reference. In addition, each furrow 34 is narrower in width than each furrow 32. In a preferred embodiment, the furrows are arranged in a repeating predetermined furrow pattern that includes one wide furrow 32 and a pair of narrow furrows 34.

The unique shape of the side wall 16 provides the cover 10 with superior columnar or stacking strength as compared to many existing thin gauge plastic covers. First ribs 26 and second ribs 28 provide structural rigidity and stacking strength by creating resistance to vertical loads and by resisting side wall denting. An advantageous feature provided by the cover 10 is that the side wall 16 has generally flat ribs 28 alternatively disposed for the easy application of a label anywhere along the side wall 16 of the cover 10 without sacrificing structural strength. The application of the label to the side wall 16 may be random because the flat ribs 28 are regularly positioned along the side wall 16. The label adheres to the outermost portions 31 of the generally flat ribs 28.

The peripheral shoulder 24 interconnects the top wall 14 and the side wall 16. The peripheral shoulder 24 includes first projections 36 and second projections 38 disposed along the perimeter, repeating in a predetermined projection pattern. In a preferred embodiment, the first projections 36 have chamfered or bevelled edges 37. Chamfered edges 37 prevent excessive thinning of polymers at the juncture of the top wall 14 and the side wall 16 in the manufacturing process and assist in distributing a lead placed on the top wall 14 of the cover 10. The first projections 36 and its chamfered edges 37 are utilized to transition from the peripheral shoulder 24 to the generally pointed ribs 26. The chamfered edges 37 are disposed at an inclusive angle of approximately 45 degrees relative to an imaginary plan extending from top wall 14. The second projections 38 along the peripheral shoulder 24 are outwardly pointed and triangular shaped.

The second projections 38 are utilized to transition from the peripheral shoulder 24 to the generally flat ribs 28. Thus, the first projections 36 are disposed above the respective first ribs 26 and the second projections 38 are disposed above the respective second ribs 28. In a preferred embodiment, the first projections 36 and the second projections 38 are arranged in a repeating projection pattern including a pair of first projections 36 and one second projection 38.

The pair of first projections 36 in the repeating projection pattern merge into gussets 40 which interconnect the peripheral shoulder 24 to the furrows 32. The gussets 40 interconnect each pair of adjacent first projections 36. Each pair of adjacent first and second projections 36 and 38 merges into gussets 42 which interconnect the peripheral shoulder to the furrows 34. In addition to the increased columnar strength provided by the shape of the side wall 16, the gussets 40 and 42 act to more evenly disperse a load placed on the cover 10 through the depending furrows 32 and 34 and the ribs 26 and 28.

Referring now to FIGS. 8–14, the base 12 includes a bottom 18 and a second side wail 20 which encompasses and extends upward from the bottom 18. As best shown in FIGS. 9, 11, 12, and 14, the base 12 is chamfered at the transition from the bottom 18 to the second side wall 20 to facilitate engagement of the base 12 with the cover 12. A lip 48 encompasses and extends outward from an upper edge of the side wall 20. The second side wall 20 includes a plurality of undercuts 50 intermittently disposed along the second side wall 20. When the cover 10 is engaged to the base 12 as depicted in FIG. 15, the undercuts 50 are adapted to releasably engage a flange 46 (FIGS. 1–7) encompassing and extending outward from a lower edge of the side wall 16. To interlock the cover 10 to the base 12, the cover 10 is moved downward toward the base 12 so as to bring the cover flange 46 into abutment with the base undercuts 50. Further downward movement of the cover 10 results in a camming action which flexes the cover flange 46 inwardly and flexes the base lip 48 outwardly. The simultaneous inward flexing of the cover flange 46 and outward flexing of the base lip 48 is sufficient to permit downward movement of the cover flange 46 into disposition below the base undercuts 50. The inherent bias of the cover flange 46 outwardly and the base lip 48 inwardly results in the entrapment of the flange 46 by the base undercuts 50 as depicted in FIG. 15. The bottom 18 of the base 12 forms a peripheral trough 51 adapted to accommodate the flange 46 (see FIG. 15), and an opening tab 52 horizontally extends from the lip 48 to facilitate removing the cover 10 from the base 12.

Figure 10:
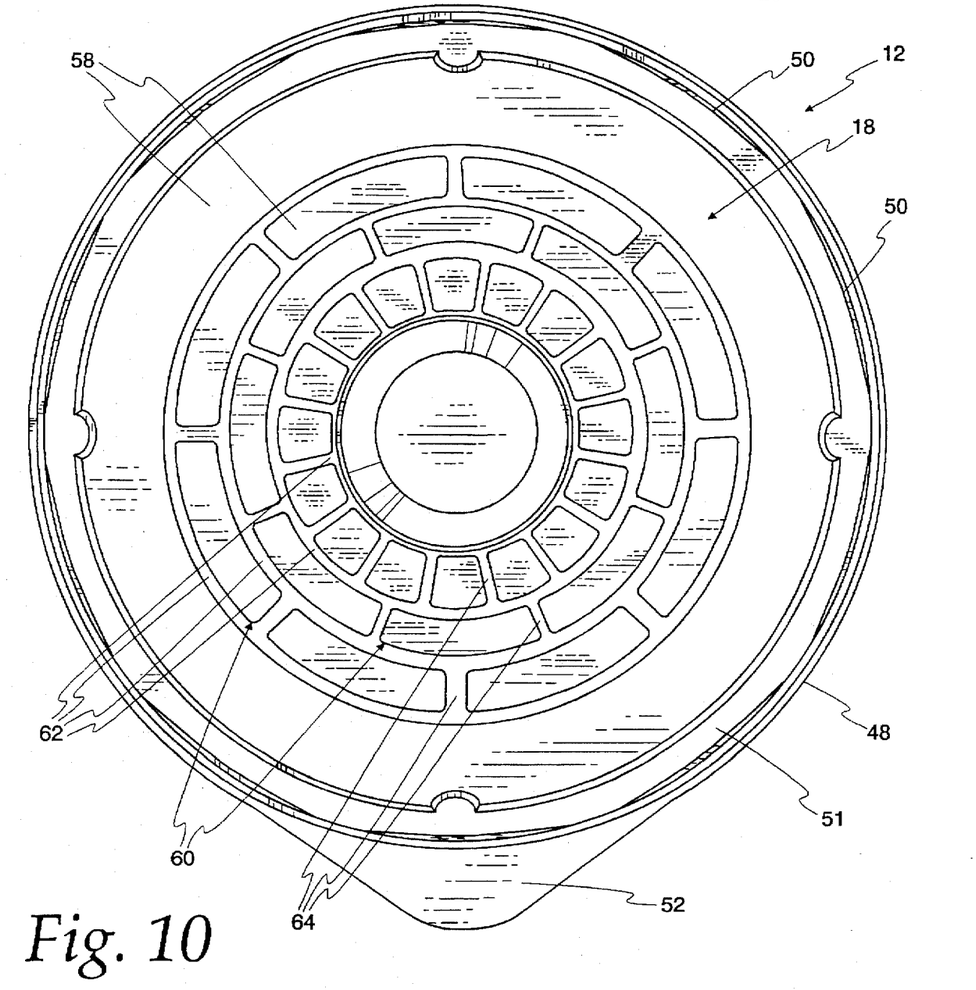
FIG. 10 is a top view of the base.
Figure 11:
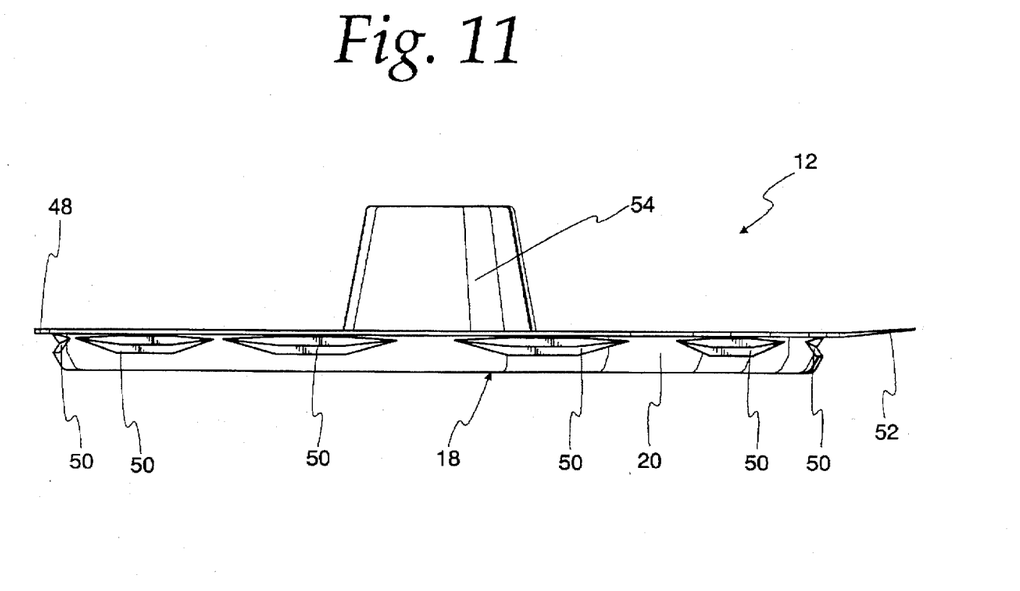
FIG. 11 is a first side view of the base.
Figure 12:
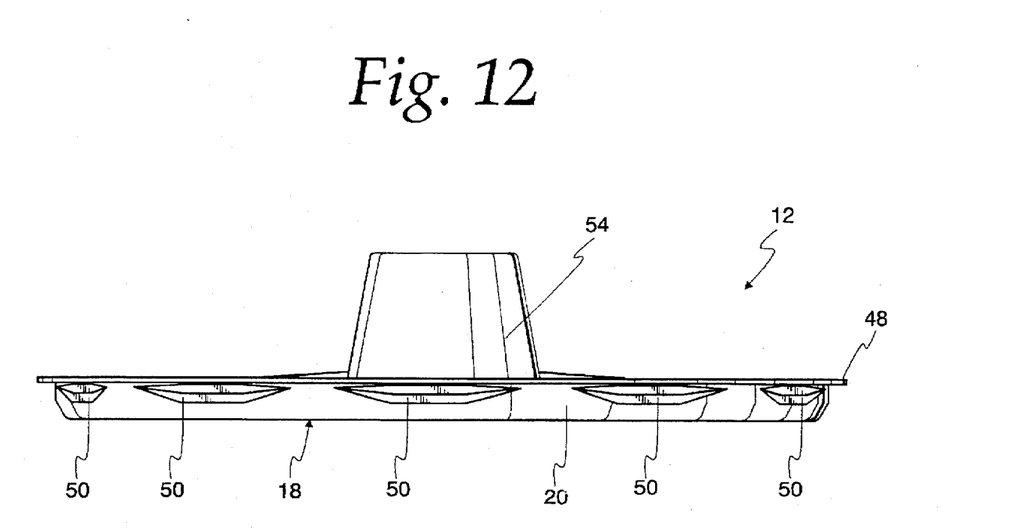
FIG. 12 is a back view of the base.
Figure 13:
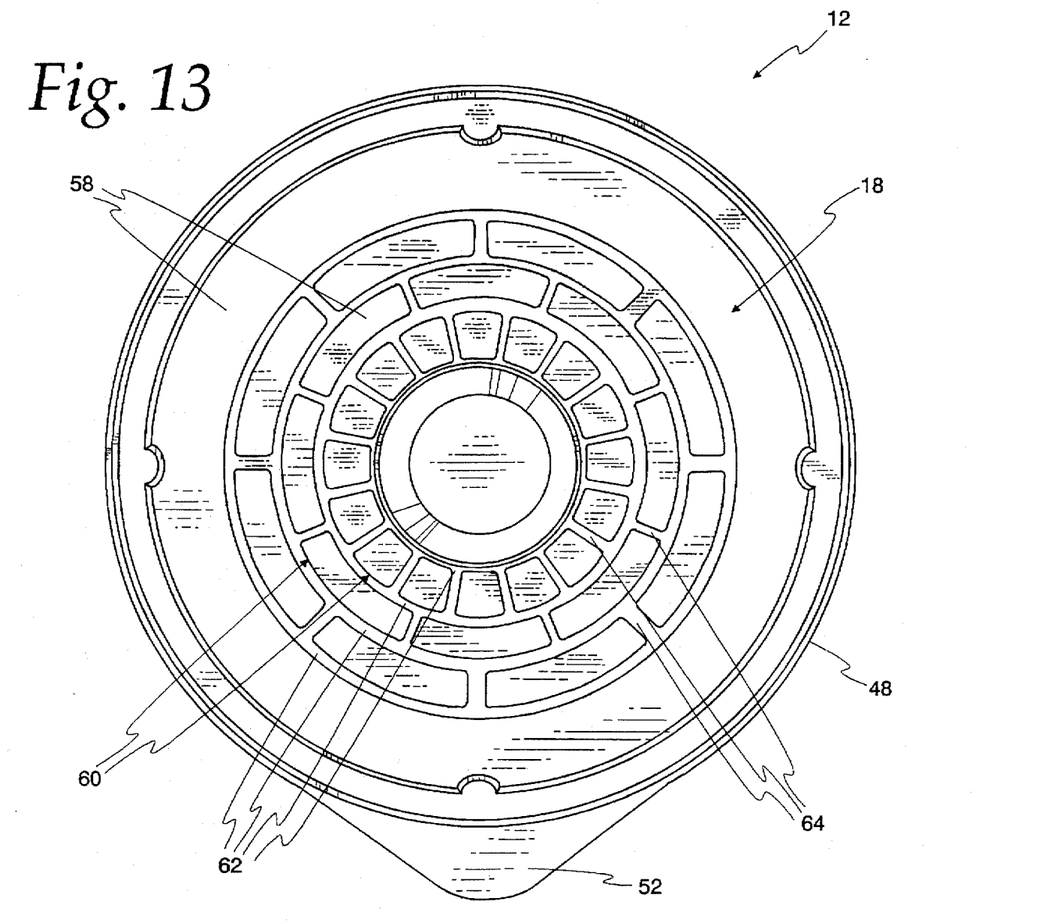
FIG. 13 is a bottom view of the base.
Figure 14:
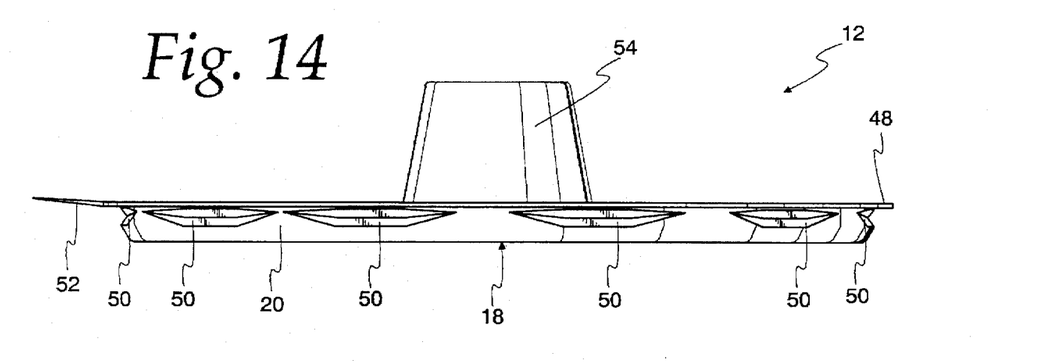
FIG. 14 is a second side view of the base.

The configuration of the base undercuts 50 allows for easy closure and yet facilitates resistance to opening. As best shown in FIGS. 9, 11, 12, and 14, each undercut 50 tapers in both the vertically upward or "z" direction near the edges thereof and in the circumferential or "θ" direction near the edges thereof. The circumferential direction is the horizontal direction as viewed in FIGS. 9, 11, 12, and 14. Additionally, as best shown in FIG. 10, each undercut 50 also tapers in the radially outward or "r" direction near the edges thereof.

The bottom 18 of the base 12 optionally forms a centrally located raised dome 54 to help support a doughnut-shaped product such as a bundt cake encased in the food packaging container. The bottom 18 may include a generally flat portion 58 and a downwardly protruding ribbed structure 60 formed on the underside of the flat portion 58. The ribbed structure 60 encompasses the raised dome 54 and has a plurality of ring-shaped ribs 62 located at different radii from an approximate center of the bottom 18. The ribbed structure 60 also has a plurality of regularly spaced radial ribs 64 extending between adjacent ring-shaped ribs. The ribbed structure 60 minimizes movement or slipping of the product accommodated within the food packaging container. Furthermore, the outermost ring-shaped rib 62 of the ribbed structure 60 is sized to snugly fit within the recessed central portion 22 of the top wall 14 of the cover 10 of another identical food packaging container positioned immediately below the base 12 to permit stacking of the containers.

The food packaging cover 10 and base 12 are preferably formed from a polymer such as oriented polystyrene or polyethylene terephthalates using conventional thermoforming or injection molding processes. The thickness of the polymer may typically range from 0.005 to 0.028 inch, but is preferably 0.010 to 0.022 inch. The base material may be opaque and may be a variety of colors or color combinations. The cover 10, on the other hand, is preferably transparent so that the customer can ascertain the nature of the accommodated product and the condition thereof without having to remove the cover 10.

The height and shape of the cover 10 and the shape and number of the ribs 26 and 28 formed in the cover 10 may vary from that shown without departing from the scope of the invention. Also, the furrows 32 and 34 and the ribs 26 and 28 may vary in width or vertical height as desired.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A food packaging cover comprising:
    a top wall including a central portion and a peripheral shoulder, said peripheral shoulder encompassing said central portion; and
    a side wall encompassing said top wall and extending downward from said peripheral shoulder, said side wall having at least first and second generally vertical and outwardly directed ribs repeating in a predetermined rib pattern, said first ribs being generally pointed at outermost portions thereof, said second ribs being generally flat at outermost portions thereof, at least one of said first ribs being disposed between adjacent ones of said second ribs, said first and second ribs forming generally vertical furrows disposed between adjacent ones of said first and second ribs, each of said first ribs being formed by a first pair of angled sides, each of said second ribs being formed by a second pair of angled sides joined by said generally flat outermost portion, said first ribs being generally triangular in cross-section.

2. The food packaging cover of claim 1, wherein said peripheral shoulder includes first and second projections disposed along a perimeter of said peripheral shoulder and repeating in a predetermined projection pattern, said first projections including chamfered outer edges.

3. The food packaging cover of claim 2, wherein said second projections are outwardly pointed and triangular shaped.

4. The food packaging cover of claim 3, wherein said first projections are disposed above respective ones of said first ribs and said second projections are disposed above respective ones of said second ribs.

5. The food packaging cover of claim 2, wherein said chamfered outer edges are disposed at an angle of approximately 45 degrees relative to an imaginary plane extending from said top wall.

6. The food packaging cover of claim 1, wherein said repeating predetermined rib pattern includes two of said first ribs and one of said second ribs.

7. The food packaging cover of claim 1, wherein said central portion of said top wall is recessed relative to said peripheral shoulder.

8. The food packaging cover of claim 7, wherein said recessed central portion is circular in shape.

9. The food packaging cover of claim 1, further including a flange encompassing and extending outwardly from a lower edge of said side wall.

10. The food packaging cover of claim 1, wherein said cover is composed of a polymer selected from a group consisting of oriented polystyrene and polyethylene terephthalates.

11. The food packaging cover of claim 10, wherein said polymer has a thickness ranging from about 0.005 inch to about 0.028 inch.

12. The food packaging cover of claim 1, wherein each of said vertical furrows between adjacent ones of said first and second ribs is formed by one of said first pair of angled sides and one of said second pair of angled sides.

13. A food packaging container comprising:
    a cover including a top wall and a first side wall, said top wall including a central portion and a peripheral shoulder, said peripheral shoulder encompassing said central portion, said first side wall encompassing said top wall and extending downward from said peripheral shoulder, said first side wall having at least first and second generally vertical and outwardly directed ribs repeating in a predetermined rib pattern, said first ribs being generally pointed at outermost portions thereof, at least one of said first ribs being disposed between adjacent ones of said second ribs, said first and second ribs forming generally vertical furrows disposed between adjacent ones of said first and second ribs, each of said first ribs being formed by a first pair of angled sides each of said second ribs being formed by a second pair of angled sides joined by said generally flat outermost portion, said first ribs being generally triangular in cross-section; and
    a base having a bottom and a second side wall, said second side wall encompassing and extending upward from said bottom, said base adapted to engage said cover.

14. The food packaging container of claim 13, wherein said base further includes a lip encompassing and extending outward from an upper edge of said second side wall.

15. The food packaging container of claim 13, wherein said peripheral shoulder includes first and second projections disposed along a perimeter of said peripheral shoulder and repeating in a predetermined projection pattern, said first projections including chamfered outer edges.

16. The food packaging container of claim 15, wherein said second projections are outwardly pointed and triangular shaped.

17. The food packaging container of claim 16, wherein said first projections are disposed above respective ones of said first ribs and said second projections are disposed above respective ones of said second ribs.

18. The food packaging cover of claim 13, wherein said repeating predetermined rib pattern includes two of said first ribs and one of said second ribs.

19. The food packaging container of claim 13, wherein said bottom forms a centrally located raised dome.

20. The food packaging container of claim 19, wherein said bottom forms a downwardly protruding ribbed pattern encircling said raised dome.

21. The food packaging container of claim 13, wherein said cover further includes a flange encompassing and extending outwardly from a lower edge of said first side wall, and wherein said second side wall includes a plurality of undercuts intermittently disposed along said second side wall, said undercuts being adapted to releasably engage said flange.

22. The food packaging container of claim 21, wherein said bottom forms a peripheral trough adapted to accommodate said flange.

23. The food packaging container of claim 13, wherein said bottom includes a generally flat portion and a ribbed structure formed on an underside of said flat portion, said ribbed structure having a plurality of ring-shaped ribs located at different radii from an approximate center of said bottom and having a plurality of regularly spaced radial ribs extending between adjacent ones of said ring-shaped ribs.

24. A method of forming a food packaging cover, comprising:

forming a top wall including a central portion and a peripheral shoulder, said peripheral shoulder encompassing said central portion; and forming a side wall encompassing said top wall and extending downward from said peripheral shoulder, said side wall having at least first and second generally vertical and outwardly directed ribs repeating in a predetermined rib pattern, said first ribs being generally pointed at outermost portions thereof, at least one of said first ribs being disposed between adjacent ones of said second ribs, said first and second ribs forming generally vertical furrows disposed between adjacent ones of said first and second ribs, each of said first ribs being formed by a first pair of angled sides, each of said second ribs being formed by a second pair of angled sides joined by said generally flat outermost portion, said first ribs being generally triangular in cross-section.

25. The method of claim 24, wherein said step of forming said top wall includes thermoforming, and wherein said step of forming said side wall includes thermoforming.

* * * * *